US008888152B1

(12) United States Patent
Coakley

(10) Patent No.: US 8,888,152 B1
(45) Date of Patent: Nov. 18, 2014

(54) HOOK ASSEMBLY FOR USE IN GRIPPING AN ENGINE PULL CORD

(71) Applicant: Thomas Coakley, Lansdale, PA (US)

(72) Inventor: Thomas Coakley, Lansdale, PA (US)

( * ) Notice: Subject to any disclaimer, the term of this patent is extended or adjusted under 35 U.S.C. 154(b) by 0 days.

(21) Appl. No.: 14/098,514

(22) Filed: Dec. 5, 2013

(51) Int. Cl.
*B65G 7/12* (2006.01)
*B25B 33/00* (2006.01)

(52) U.S. Cl.
CPC .................................... *B25B 33/00* (2013.01)
USPC ............................ 294/26; 224/267; 224/268

(58) Field of Classification Search
USPC ........ 294/15, 25, 26, 145, 169; 224/267, 268; 482/139
See application file for complete search history.

(56) References Cited

U.S. PATENT DOCUMENTS

| | | | | | |
|---|---|---|---|---|---|
| 309,408 | A | * | 12/1884 | Scott | 294/26 |
| 673,830 | A | * | 5/1901 | Wade | 294/26 |
| 810,098 | A | * | 1/1906 | Walter | 30/123.5 |
| 1,279,073 | A | * | 9/1918 | Baake | 224/267 |
| 1,428,285 | A | * | 9/1922 | Herbert | 224/267 |
| 1,985,571 | A | * | 12/1934 | Hetzel | 294/27.1 |
| 2,278,610 | A | | 4/1942 | Brownson | |
| 4,487,412 | A | | 12/1984 | Meeko | |
| 5,038,987 | A | * | 8/1991 | Huddleston | 224/258 |
| 5,261,581 | A | * | 11/1993 | Harden, Sr. | 224/219 |
| 5,571,228 | A | * | 11/1996 | McMurtrie | 43/21.2 |
| 6,849,036 | B2 | * | 2/2005 | Forslid | 482/139 |
| 7,008,355 | B2 | * | 3/2006 | Emick | 482/139 |
| 8,267,844 | B2 | * | 9/2012 | Kassel et al. | 482/139 |
| 2003/0019894 | A1 | * | 1/2003 | Caldana | 224/165 |

* cited by examiner

*Primary Examiner* — Dean Kramer
(74) *Attorney, Agent, or Firm* — LaMorte & Associates, P.C.

(57) ABSTRACT

A hook assembly that assists a person in engaging the handle of a pull cord from a gasoline engine. The hook assembly engages the handle with a hooked plate. The hooked plate has a curved section that forms a catch trough that directly engages and holds the handle of the pull cord. A cord slot is disposed within the curved section of the hooked plate. The cord slot extends into the catch trough. This divides the hooked plate into two curved fingers on either side of the cord slot. A wrist band is wrapped around the wrist of a user. The hooked plate is joined to the wrist band with a pivoting connection. The pivoting connection enables the hooked plate to be selectively positioned between a deployed position and a stored configuration.

16 Claims, 5 Drawing Sheets

HOOK ASSEMBLY FOR USE IN GRIPPING AN ENGINE PULL CORD

BACKGROUND OF THE INVENTION

1. Field of the Invention

In general, the present invention relates to hook assemblies that attach to a user's hand or arm. More particularly, the present invention relates to hook assemblies that increase the gripping strength of a user.

2. Prior Art Description

Many modern day tools and lawn equipment are powered by small gasoline engines. Examples of such equipment include lawn mowers, chainsaws, power washers, grass trimmers, and the like. Most of such equipment use small gasoline engines that are started by pulling a pull cord. When the pull cord is pulled, it causes the gasoline engine to turn and the spark plug to fire. This starts the engine so that it can run on its own.

In order to help a person grasp a pull cord, most pull cords terminate with a rigid T-shaped handle. T-shaped handles vary in size depending upon the size of the gasoline engine being started. Larger engines tend to have longer pull cords and larger handles than do smaller ones.

As anyone with experience will likely agree, when a small gasoline engine is started with a pull cord, the pull cord typically must be pulled more than once. In many cases, the pull cord must be pulled several times. Furthermore, the pull cord must be pulled very rapidly so that the gasoline engine can be caused to turn with enough speed to start the engine. As a consequence, a significant amount of physical strength and endurance is needed to start many pull cord engines.

It is often the case that a user has enough arm strength to pull a pull cord multiple times. However, the user may lack the hand strength to maintain a grip on the T-shaped handle during the pulls. The result is that a user often loses his/her grip and releases the handle of the pull cord before the pull cord is fully drawn. Without the pull cord being fully drawn, the engine has a very small chance of starting.

In the prior art, there are many devices that are designed to strap to a person's hand and increase their gripping power. Often such devices provide a metal hook for engaging an object. The presence of the hook eliminates the need for the hand to grip any object that can be engaged with the hook. Such prior art is exemplified by U.S. Pat. No. 4,487,412 to Meeko, entitled Weight Lifting Grips and U.S. Pat. No. 2,278,610 to Brownson, entitled Bundle Picker.

Although many hook attachments exist for hands, these prior art hooks are poorly designed to use with engaging the T-shaped handle of an engine's pull cord. Furthermore, even if such prior art hooks could engage a pull cord handle, the presence of the hook obstructs the hand. The hook must therefore be detached from the hand so that the hand is free to manipulate the equipment being used. Having to attach and detach a hook from a hand each time a pull cord engine is started and stopped is both inconvenient and impractical.

A need therefore exists for a hook device that is specifically designed to engage the handle of a pull cord engine. A need also exists for a hook that can be folded into an unobtrusive position without the need of having to detach the hook from the user's hand. These needs are met by the present invention as described and claimed below.

SUMMARY OF THE INVENTION

The present invention is a hook assembly that assists a person in engaging the handle of a pull cord from a small gasoline engine. The hook assembly engages the handle with a hooked plate. The hooked plate has a first surface and an opposite second surface that both extend between a first end and a second end. The hooked plate has a flat section that extends a predetermined distance from the second end. The hooked plate also has a curved section that extends from the flat section to the first end. The curved section forms a catch trough that directly engages and holds the handle of the pull cord.

A cord slot is disposed within the curved section of the hooked plate. The cord slot extends from the first end of the hooked plate and into the catch trough. This divides the hooked plate into two curved fingers on either side of the cord slot.

A wrist band is provided that is wrapped around the wrist of a user. The hooked plate is joined to the wrist band, proximate the second end of the hooked plate, with a pivoting connection. The pivoting connection enables the hooked plate to be selectively positioned between a deployed position, wherein the hooked plate extends away from the wrist band and a stored configuration where the hooked plate rests against the wrist band. A retention mechanism can be used to retain the hooked plate in its stored configuration.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention hook assembly can be embodied in many ways, only two exemplary embodiments of the hook assembly are illustrated. These embodiments are selected in order to set forth some of the best modes contemplated for the invention. The illustrated embodiments, however, are merely exemplary and should not be considered a limitation when interpreting the scope of the appended claims.

Figure 1:
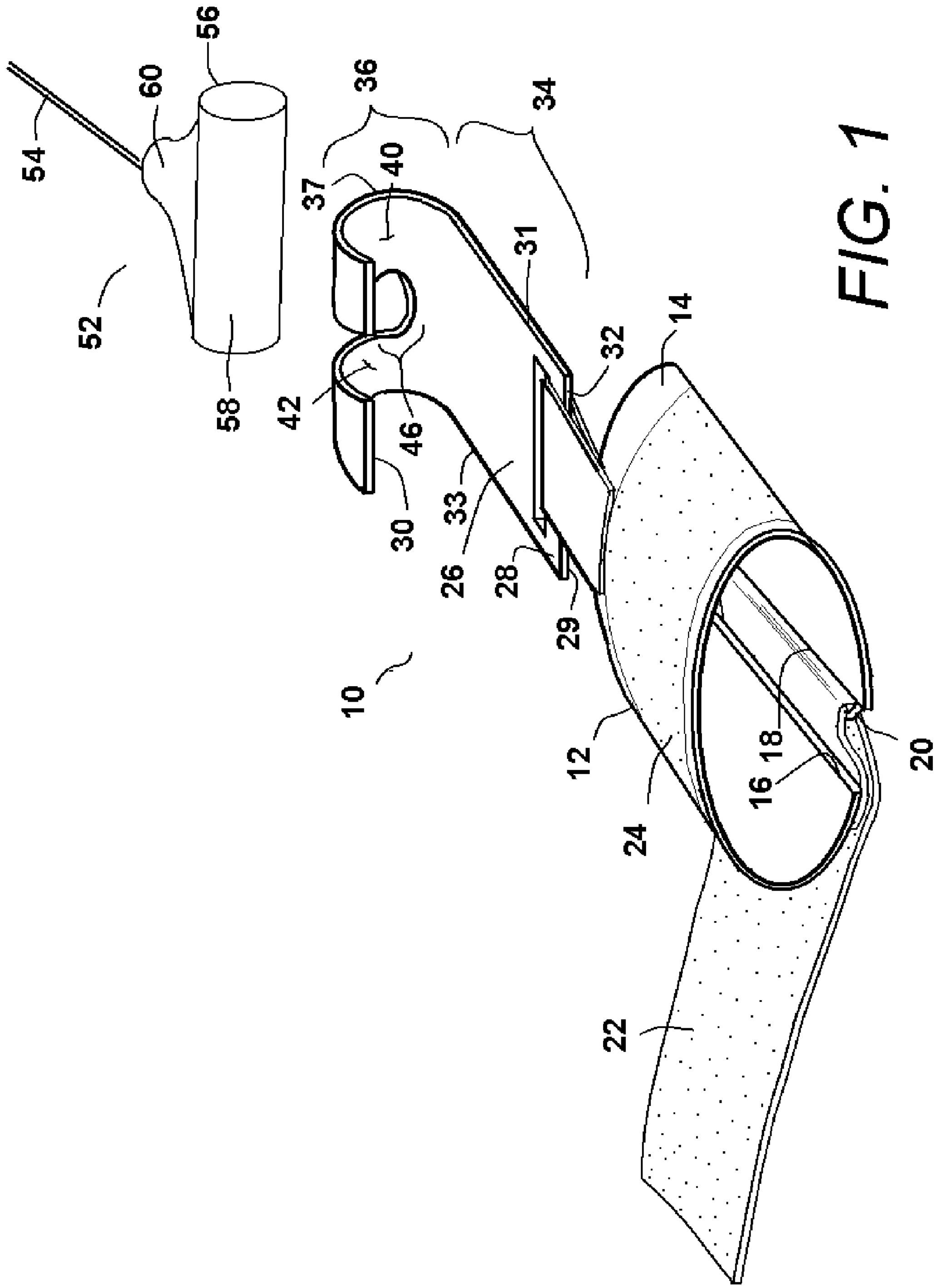
FIG. 1 is a perspective view of an exemplary embodiment of a hook assembly, shown in conjunction with a segment of a pull cord.
Figure 2:
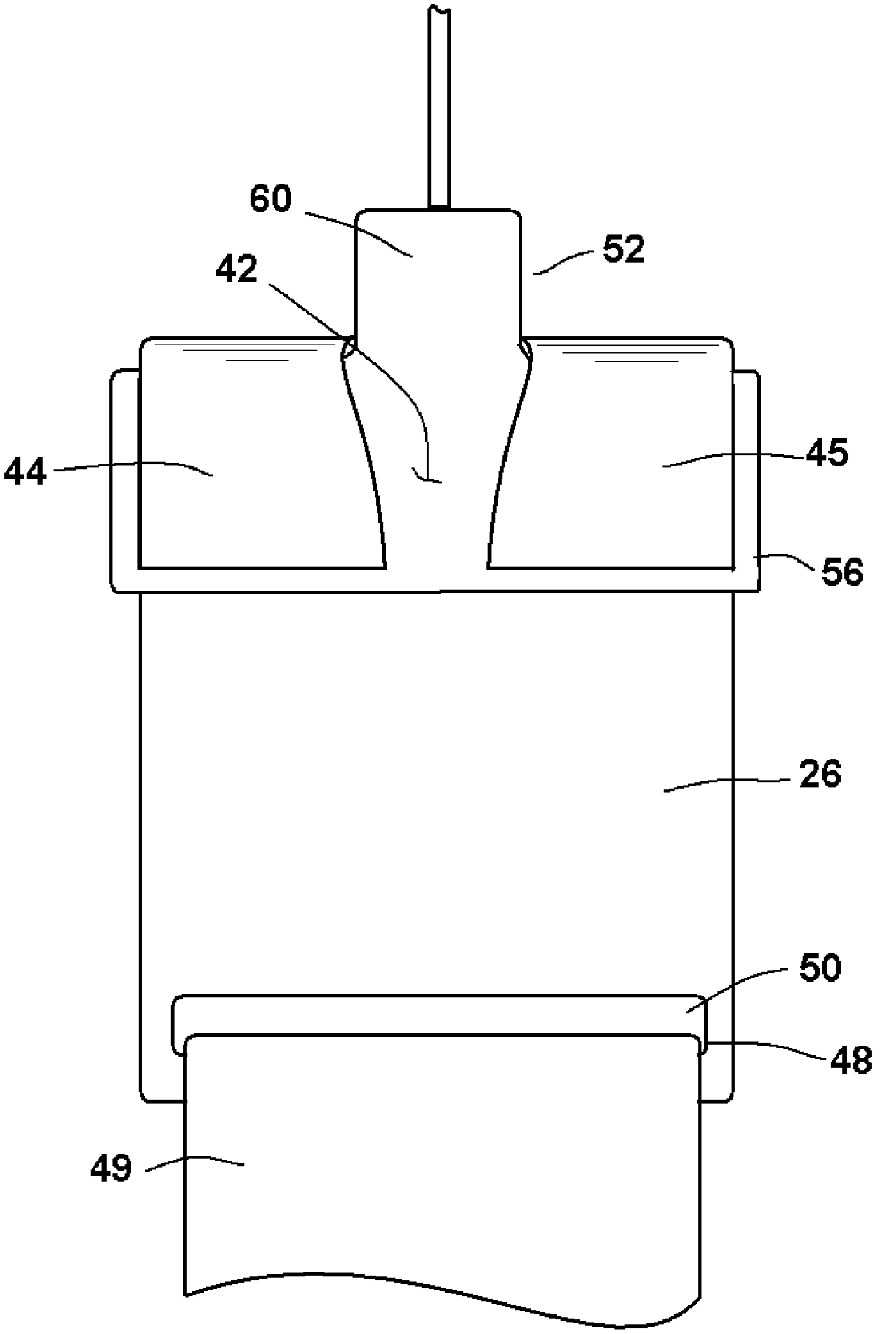
FIG. 2 is a fragmented front view of part of the hook assembly engaging the handle of a pull cord.
Figure 3:
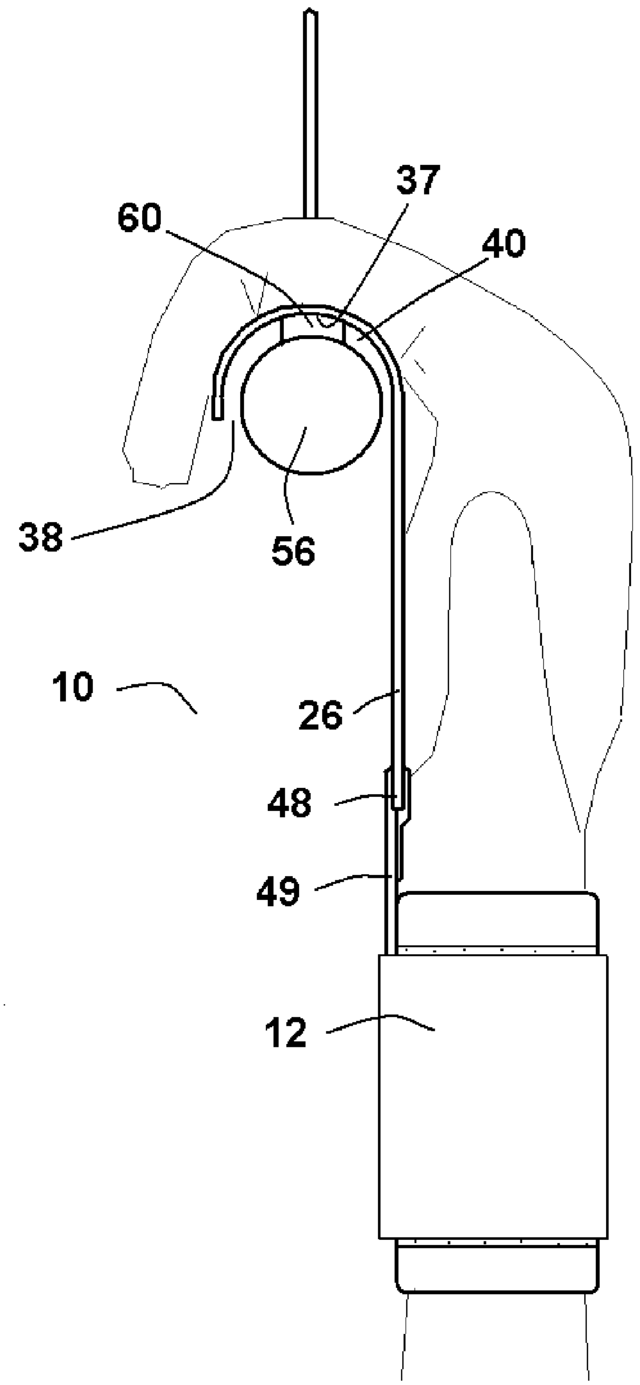
FIG. 3 is a side view showing a hand engaging the hook assembly and the hook assembly in its deployed configuration.

Referring to FIG. 1 in conjunction with FIG. 2 and FIG. 3, it can be seen that a hook assembly 10 is provided that attaches to the wrist of a user's arm. The hook assembly 10 utilizes a wrist band 12 for the attachment. The wrist band 12 contains a flexible padded base 14 that partially wraps around the user's wrist and contacts the skin of the wrist. The padded base 14 can be padded fabric, an elastomeric material, or a sewn assembly of both. The padded base 14 has enough flexibility to enable it to wrap around the user's wrist.

The padded base 14 has a first end 16 and an opposite second end 18. A loop structure 20 is affixed to the padded base 14 proximate its first end 16. A strap 22 is anchored to the padded base 14 proximate the second end 18. The strap 22 passes through the loop structure 20 and folds back onto itself. Hook and loop fastening material 24 is provided to set the strap 22 in place. Thus, by tensioning the strap 22, the first end 16 and the second end 18 of the padded base 14 can be drawn toward each other, therein tightening the wrist band 12 around the user's wrist.

A hooked plate 26 is provided. The hooked plate 26 is rigid and is preferably made from either metal or hard plastic. The hooked plate 26 has a front surface 28 and a back surface 29 that are defined along their periphery by a first end 30, an opposite second end 32 and two side ends 31, 33. A flat palm section 34 extents from the second end 32 a predetermined distance toward the first end 30. The predetermined distance is preferably between two and three inches.

As the hooked plate 26 structure approaches the first end 16, it enters a curved section 36. In the curved section 36, the hooked plate 26 bends between 150 degrees and 180 degrees about a circular radius. The hooked plate 26 bends in a direction so that the front surface 28 becomes concave and the back surface 29 becomes convex. The curved section 36 creates a semicircular catch trough 40 with a nadir 37 and an opening 38 that is opposite the nadir 37. The opening 38 faces the second end 32.

A cord slot 42 is formed in the hooked plate 26. The cord slot 42 begins in the center of the first end 30 of the hooked plate 26 and progresses through the hooked plate 26 until it reaches the bottom of the catch trough 40. This divides the curved section 36 into two fingers 44, 45 on either side of the cord slot 42. The fingers 44, 45 begin at the bottom of the catch trough 40 and progress toward the first end 30 of the hooked plate 26.

The catch trough 40 has a radius of curvature with a preferred diameter of between one inch and 1.5 inches. The fingers 44, 45 on either side of the cord slot 42 have a preferred width of between 0.5 inches and 1.0 inch. The cord slot 42 has a preferred width of no greater than one inch between the fingers 44, 45. However, the cord slot 42 has a wider head region 46 in the catch trough 40. In the wider head region 46, the slot 42 has a maximum diameter of 1.5 inches.

The hooked plate 26 is connected to the wrist band 12 using a pivoting connection 48. In the exemplary embodiment, the pivoting connection 48 is created using a length of flexible fabric 49 that is sewn to the wrist band 12 and is passed through a slit 50 near the second end 32 of the hooked plate 26. However, other pivoting connections, including mechanical hinges, can also be used.

Figure 4:
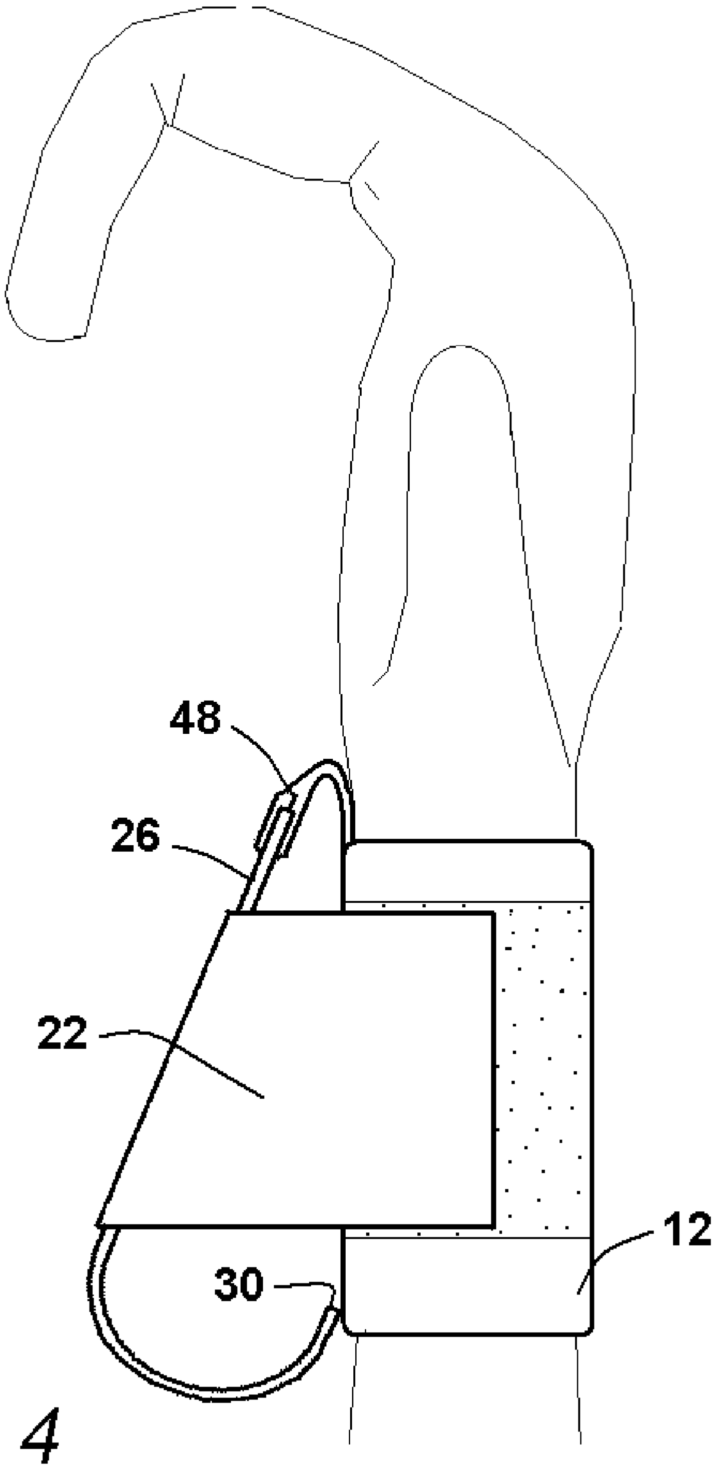
FIG. 4 is a side view showing a hand engaging the hook assembly and the hook assembly in its stored configuration.

The pivoting connection 48 enables the hooked plate 26 to rotate relative the wrist band 12 between a deployed configuration and a stored configuration. The deployed configuration is shown in FIGS. 1, 2, and 3. In this deployed configuration, the pivoting connection 48 orients the hooked plate 26 away from the wrist band 12, wherein the hooked plate 26 and the wrist band 12 do not overlap. The stored configuration is shown in FIG. 4. In the stored configuration, the hooked plate 26 is rotated about the pivoting connection 48 until the first end 30 of the hooked plate 26 touches the wrist band 12.

A typical pull cord 52 has a piece of flexible cord 54 that is terminated with a T-shaped plastic handle 56. The handle 56, being T-shaped, has a cylindrical crossbar 58 and a stem 60 that extends down from the center of the crossbar 58. The flexible cord 54 enters the handle 56 through the center the stem 60. The crossbar 58 typically has a diameter of one inch or less. Likewise, the crossbar 58 of the stem 60 typically has a diameter of one inch or less. The length of the crossbar 58 is typically between three and five inches.

The hooked plate 26 is designed to engage the handle 56 of the pull cord 52. The catch trough 40 of the hooked plate 26 receives the crossbar 58 of the handle 56. The stem 60 of the handle 56 extends through the head region 46 of the cord slot 42 in the hooked plate 26. As such, a positive mechanical interconnection is created between the hooked plate 26 and the pull cord handle 56. As a consequence, any pull force applied to the hooked plate 26 is transferred directly to the handle 56 of the pull cord 52.

The hooked plate 26 is bound to the wrist of a user using the wrist band 12. Furthermore, the hooked plate 26 is sized so that when in its deployed configuration (FIGS. 1, 2 and 3) the flat palm section 34 of the hooked plate 26 lay against the user's palm, while the user's finger extends around the outside of the catch trough 40.

To utilize the hook assembly 10, the wrist band 12 is secured to a user's wrist. The hooked plate 26 is moved into its deployed position so that it is engaged by the palm and fingers of the user's hand. The handle 56 of the pull cord 52 is engaged with the hooked plate 26. The user can then pull the pull cord 52 by pulling on the hooked plate 26. The hooked plate 26 is engaged by both the fingers of the user and the wrist band 12. In this manner, even if a user has weak fingers, the handle 56 of the pull cord 52 will remain engaged with the hook assembly 10 during the pulling action. In fact, even if a person did not use their fingers at all, the pull cord 52 would be pulled solely by the movement of the user's wrist.

Referring to FIG. 4 in conjunction with FIG. 1 and FIG. 3, it can be seen that once the pull cord 52 is pulled and a gasoline engine started, the hooked plate 26 can be moved into a stored configuration. In the stored configuration, the hooked plate 26 is rotated about the pivoting connection 48. This rotates the hooked plate 26 away from the finger and palm of the user's hand. The hooked plate 26 rotates until the fingers 44, 45 contact the wrist band 12. Once in contact with the wrist band 12, the hooked plate 26 can be maintained in the stored configuration by passing the strap 22 of the wrist band 12 over the hooked plate 26. As such, the strap 22 serves two purposes. First, the strap 22 tightens the wrist band 12. Second, the strap 22 serves as a retention mechanism that holds the hooked plate 26 in its stored configuration.

Once secured in the stored configuration, both the wrist band 12 and the hooked plate 26 are positioned below the user's hand. The user is therefore free to use his/her hand unencumbered to grasp and manipulate the lawnmower, power tool, or other equipment that has just been started. The hook assembly 10 remains secured to the user's wrist. As such, should the engine stall while being used, the user can easily reposition the hook assembly 10 to its deployed position and again pull the handle 56 of the pull cord 52.

Figure 5:
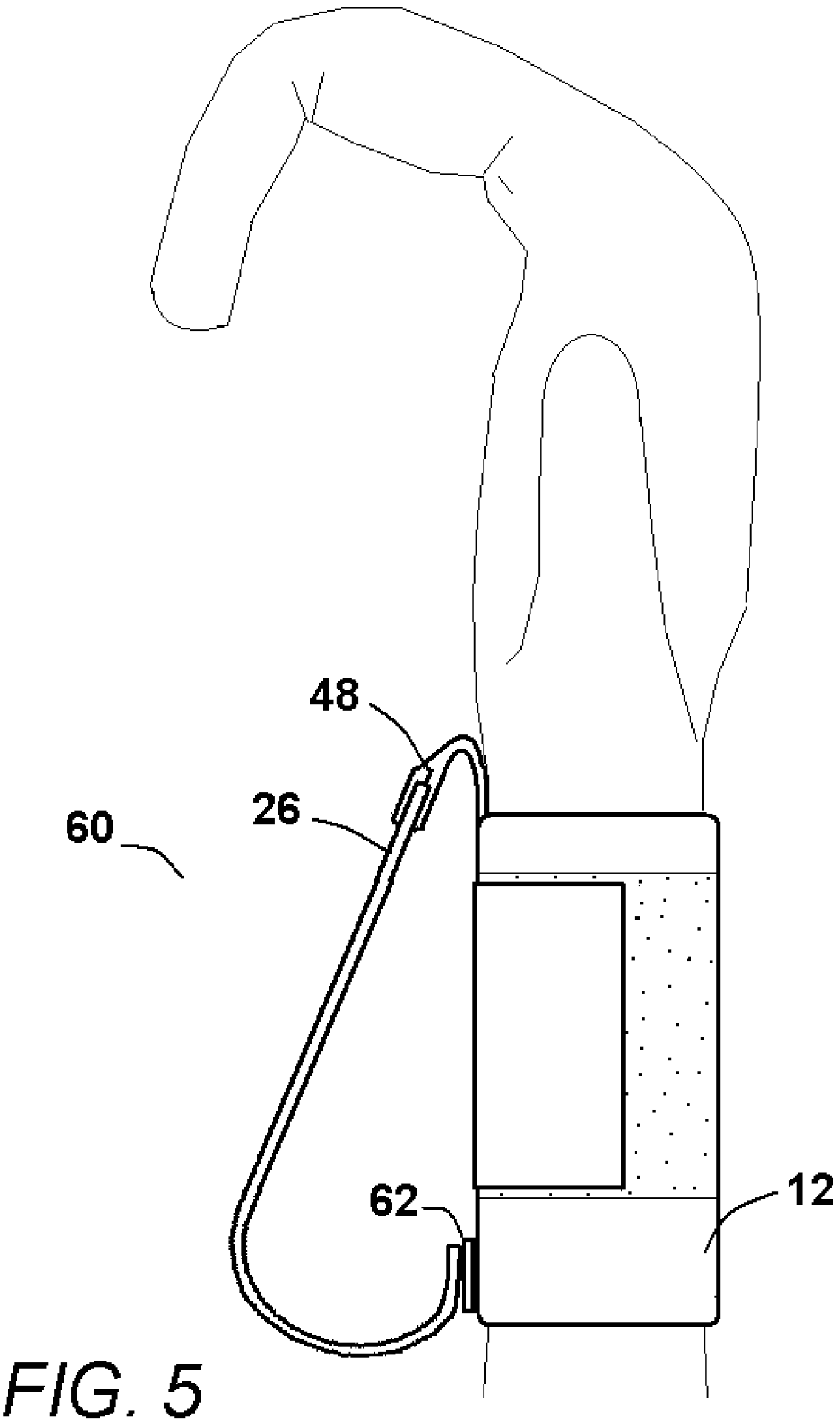
FIG. 5 is a side view of an alternate embodiment of the present invention showing a hand engaging the hook assembly and the hook assembly in a stored configuration.

Referring to FIG. 5, an alternate embodiment of a hook assembly 60 is shown. This embodiment has the same hooked plate 26, wrist band 12, and pivoting connection 48. As such, the same reference numbers are used. What makes this embodiment different from the earlier embodiment is the presence of a magnet 62 on the wrist band 12.

The hooked plate 26 can be moved into a stored configuration. In the stored configuration, the hooked plate 26 is rotated about the pivoting connection 48. This rotates the hooked plate 26 away from the finger and palm of the user's hand. The hooked plate 26 rotates until the hooked plate 26 contacts the magnet 62 on the wrist band 12. Once in contact with the magnet 62, the hooked plate 26 can be maintained in the stored configuration by magnetic attraction.

Once secured in the stored configuration, both the wrist band 12 and the hooked plate 26 are positioned below the user's hand. The user is therefore free to use his/her hand unencumbered to grasp and manipulate the lawnmower, power tool, or other equipment that has just been started. The hook assembly 60 remains secured to the user's wrist and ready for use.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A hook assembly, comprising:

a plate having a first surface and an opposite second surface that extend between a first end and a second end, said plate having a flat section that extends a predetermined distance from said second end, and a curved section that extends from said flat section to said first end, wherein said curved section forms a catch trough;

a slot disposed within said plate that extends from said first end into said catch trough, therein dividing said plate into two curved fingers on either side of said slot;

a wrist band, wherein said plate is joined to said wrist band proximate said second end with a pivoting connection that enables said plate to be selectively positioned between a deployed position, where said plate extends away from said wrist band, and a stored configuration where said plate rests against said wrist band; and a retention mechanism for retaining said plate in said stored configuration.

2. The assembly according to claim 1, wherein said retention mechanism includes a magnet attached to said wrist band that magnetically engages said plate when said plate in said stored configuration.

3. The assembly according to claim 1, wherein said wrist band contains a base and a strap that attaches to said base with hook and loop fasteners, wherein said strap passes over said plate when in said stored configuration and retains said plate in said stored configuration.

4. The assembly according to claim 1, wherein said pivoting connection is a fabric strap that extends from said wrist band and engages said plate.

5. The assembly according to claim 1, wherein said slot has an enlarged head region disposed within said catch trough.

6. The assembly according to claim 1, wherein each of said fingers has a width of at least one half inch.

7. The assembly according to claim 1, wherein said plate is metal.

8. The assembly according to claim 1, wherein said plate curves toward said first surface in said curved section and has a radius of curvature of between one inch and 1.5 inches.

9. A hook assembly for engaging the handle of a pull cord, said hook assembly comprising:

a hooked plate having a first end, a second end and two side ends, said hooked plate having a flat section proximate said second end, and a curved section that extends from said flat section to said first end, wherein said curved section forms a catch trough;

a cord slot disposed within said curved section halfway between said two side ends;

a wrist band; and a pivoting connection that joins said hooked plate to said wrist band, therein enabling said wrist band to rotate about said pivoting connection over ninety degrees relative said wrist band, wherein said pivoting connection enables said hooked plate to be selectively positioned between a deployed position, where said hooked plate extends away from said wrist band, and a stored configuration where said plate rests against said wrist band; and a retention mechanism for retaining said hooked plate in said stored configuration.

10. The assembly according to claim 9, wherein said wrist band contains a base and a strap that attaches to said base with hook and loop fasteners, wherein said strap passes over said hooked plate when in said stored configuration and retains said plate in said stored configuration.

11. The assembly according to claim 9, wherein said pivoting connection is a fabric strap that extends from said wrist band and engages said hooked plate proximate said second end.

12. The assembly according to claim 9, wherein said catch trough has a nadir and said cord slot extends from said first end to at least said nadir.

13. The assembly according to claim 12, wherein said cord slot expands in size at said nadir of said catch trough.

14. The assembly according to claim 9, wherein said curved section is at least one half inch wide on either side of said slot.

15. The assembly according to claim 9, wherein said plate is metal.

16. The assembly according to claim 9, wherein said curved section curves at least 150 degrees from said flat section.

* * * * *